United States Patent
Jones et al.

(10) Patent No.: US 12,071,559 B2
(45) Date of Patent: Aug. 27, 2024

(54) COATING COMPOSITIONS CONTAINING ACID FUNCTIONAL POLYOL POLYMERS AND COATINGS FORMED THEREFROM

(71) Applicant: PPG Industries Ohio, Inc., Cleveland, OH (US)

(72) Inventors: Ian Michael Jones, Pittsburgh, PA (US); Egle Puodziukynaite, Allison Park, PA (US); Shanti Swarup, Allison Park, PA (US); James C. Serene, Lower Burrell, PA (US); Paul H. Lamers, Allison Park, PA (US); Steven V. Barancyk, Wexford, PA (US); Craig A. Wilson, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 631 days.

(21) Appl. No.: 17/290,237

(22) PCT Filed: Nov. 1, 2019

(86) PCT No.: PCT/US2019/059505
§ 371 (c)(1),
(2) Date: Apr. 29, 2021

(87) PCT Pub. No.: WO2020/092983
PCT Pub. Date: May 7, 2020

(65) Prior Publication Data
US 2022/0017767 A1  Jan. 20, 2022

Related U.S. Application Data

(60) Provisional application No. 62/754,283, filed on Nov. 1, 2018.

(51) Int. Cl.
| C08G 18/10 | (2006.01) |
| B05D 7/14 | (2006.01) |
| C08F 212/08 | (2006.01) |
| C08F 220/06 | (2006.01) |
| C08F 220/18 | (2006.01) |
| C08F 220/20 | (2006.01) |
| C08G 18/62 | (2006.01) |
| C08G 18/73 | (2006.01) |
| C09D 133/06 | (2006.01) |
| C09D 175/04 | (2006.01) |

(52) U.S. Cl.
CPC .......... C09D 133/066 (2013.01); B05D 7/14 (2013.01); C08F 212/08 (2013.01); C08F 220/06 (2013.01); C08F 220/1804 (2020.02); C08F 220/20 (2013.01); C08G 18/10 (2013.01); C08G 18/6229 (2013.01); C08G 18/73 (2013.01); C09D 175/04 (2013.01); B05D 2202/00 (2013.01)

(58) Field of Classification Search
CPC .. C09D 133/066; C08F 220/06; C08F 220/18; C08G 18/10
USPC ........................................................ 528/169
See application file for complete search history.

(56) References Cited

U.S. PATENT DOCUMENTS

| 3,337,497 | A | 8/1967 | Bostick |
| 3,663,649 | A | 5/1972 | Wheeler |
| 3,665,052 | A | 5/1972 | Saam et al. |
| 5,281,666 | A | 1/1994 | Hoxmeier |
| 5,296,574 | A | 3/1994 | Hoxmeier |
| 5,618,903 | A | 4/1997 | Hoxmeier et al. |
| 5,925,707 | A | 7/1999 | Shafer et al. |
| 5,962,074 | A | 10/1999 | Wollner |
| 6,020,430 | A | 2/2000 | Schwindeman et al. |
| 6,258,891 | B1 | 7/2001 | Hoxmeier |
| 6,258,897 | B1 | 7/2001 | Epple et al. |
| 7,960,495 | B2 | 6/2011 | Barancyk et al. |
| 7,968,198 | B2 | 6/2011 | Barancyk et al. |
| 8,623,958 | B2 | 1/2014 | Kojima et al. |
| 9,029,428 | B2 | 5/2015 | Kojima et al. |
| 2007/0149744 | A1 | 6/2007 | Yan et al. |
| 2010/0137454 | A1 | 6/2010 | Barmes et al. |
| 2011/0165206 | A1 | 7/2011 | Liu et al. |
| 2012/0020909 | A1 | 1/2012 | Courel et al. |
| 2012/0046415 | A1 | 2/2012 | Millward et al. |
| 2014/0323640 | A1 | 10/2014 | Lock et al. |

(Continued)

FOREIGN PATENT DOCUMENTS

| EP | 0638591 A2 | 2/1995 |
| GB | 2109385 A | 6/1983 |
| RU | 2411256 C1 | 2/2011 |

(Continued)

OTHER PUBLICATIONS

Office Action received in European Appln No. 19835884.8, mailed on Apr. 13, 2023, 4 pages.

*Primary Examiner* — Terressa Boykin
(74) *Attorney, Agent, or Firm* — Krisanne Shideler

(57) ABSTRACT

A coating composition includes: (a) an acid functional polyol polymer having an acid value of greater than 9 mg KOH/g and less than 60 mg KOH/g, and a hydroxyl value of from 100 to 300 mg KOH/g; (b) a non-aminoplast derived crosslinker reactive with the acid functional polyol polymer; and (c) a non-aqueous liquid medium. Further, an equivalent ratio of functional groups on the crosslinker reactive with hydroxyl functional groups to hydroxyl functional groups on the acid functional polyol polymer is within a range of from 0.5 to 1.5. The coating composition is substantially free of an external catalyst. The coating composition cures at a temperature of less than 80° C.

21 Claims, No Drawings

(56) References Cited

U.S. PATENT DOCUMENTS

2018/0043718 A1 2/2018 Masubuchi et al.

FOREIGN PATENT DOCUMENTS

| RU | 2440374 C2 | 1/2012 |
| RU | 2591153 C2 | 7/2016 |

COATING COMPOSITIONS CONTAINING ACID FUNCTIONAL POLYOL POLYMERS AND COATINGS FORMED THEREFROM

FIELD OF THE INVENTION

The present invention relates to coating compositions containing acid functional polyol polymers and coatings formed therefrom.

BACKGROUND OF THE INVENTION

Coatings are applied to a wide variety of substrates to provide color and other visual effects, corrosion resistance, abrasion resistance, chemical resistance, and the like. In addition, various types of coatings, such as coatings applied to automotive substrates including vehicles, can be formed from compositions that can be baked and formed at low cure temperatures. In order to form coatings at low cure temperatures, the corresponding coating compositions typically contain an external catalyst. However, many catalysts used to form coatings at low temperatures are typically heavy metals that are toxic, such as tin catalysts. It is accordingly an objective of the present invention to provide coating compositions that can be cured at comparatively low temperatures to form coatings having various properties, such as good appearance, and which do not require the use of an external catalyst such as a metal (e.g. tin) catalyst.

SUMMARY OF THE INVENTION

The present invention relates to a coating composition comprising: (a) an acid functional polyol polymer comprising an acid value of greater than 9 mg KOH/g and less than 60 mg KOH/g, and a hydroxyl value of from 100 to 300 mg KOH/g; (b) a non-aminoplast derived crosslinker reactive with the acid functional polyol polymer; and (c) a non-aqueous liquid medium. Further, an equivalent ratio of functional groups on the crosslinker reactive with hydroxyl functional groups to hydroxyl functional groups on the acid functional polyol polymer is within a range of from 0.5 to 1.5. The coating composition is substantially free of an external catalyst and cures at a temperature of less than 80° C.

The present invention also relates to substrates at least partially coated with the coating compositions described herein.

The present invention further relates to a method of forming a coating over at least a portion of a substrate comprising applying a coating composition as described herein and curing the coating composition at a temperature of less than 80° C. to form a coating over at least a portion of the substrate.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" crosslinker, and the like refer to one or more of any of these items.

As previously described, the present invention is directed to a coating composition comprising an acid functional polyol polymer and a non-aminoplast derived crosslinker reactive with the acid functional polyol polymer. As used herein, a "polyol polymer" refers to a polymer having two or more, such as three or more, hydroxyl functional groups. Further, the term "polymer" refers to oligomers and homopolymers (e.g., prepared from a single monomer species), copolymers (e.g., prepared from at least two monomer species), terpolymers (e.g., prepared from at least three monomer species) and graft polymers. The term "resin" is used interchangeably with "polymer." Thus, an "acid functional polyol polymer" refers to a polymer comprising hydroxyl functional groups and acid functional groups.

It is appreciated that the acid functional polyol polymer acts as a film-forming resin. As used herein, a "film-forming resin" refers to a self-supporting continuous film on at least a horizontal surface of a substrate upon removal of any diluents or carriers present in the composition or upon curing. The terms "curable", "cure", and the like, as used in connection with a coating composition, means that at least a portion of the components that make up the coating composition are polymerizable and/or crosslinkable. Cure, or the degree of cure, can be determined by dynamic mechanical thermal analysis (DMTA) using a Polymer Laboratories MK III DMTA analyzer conducted under nitrogen in which the degree of cure can for example be at least 10%, such as at least 30%, such as at least 50%, such as at least 70%, or at least 90% of complete crosslinking as determined by DMTA.

The coating composition of the present invention can be cured at ambient conditions, with heat, or with other means such as actinic radiation. The term "actinic radiation" refers to electromagnetic radiation that can initiate chemical reactions. Actinic radiation includes, but is not limited to, visible light, ultraviolet (UV) light, X-ray, and gamma radiation. Further, "ambient conditions" refers to the conditions of the surrounding environment (e.g., the temperature, humidity, and pressure of the room or outdoor environment in which the substrate is located such as, for example, at a temperature of 23° C. and at a relative humidity in the air of 35% to 75%).

The acid functional polyol polymer of the present invention can be obtained from reactants comprising (i) an ethylenically unsaturated compound comprising acid functional groups, or an anhydride thereof, (ii) an ethylenically unsaturated compound comprising hydroxyl functional groups, and (iii) an ethylenically unsaturated compound that is different from (i) and (ii). As used herein, "ethylenically unsaturated" refers to a group having at least one carbon-carbon double bond. Non-limiting examples of ethylenically unsaturated groups include, but are not limited to, (meth)acrylate groups, vinyl groups, other alkenes, and combinations thereof. As used herein, the term "(meth)acrylate" refers to both the methacrylate and the acrylate.

The ethylenically unsaturated compound can comprise ethylenically unsaturated monomers and/or polymers. The ethylenically unsaturated compounds can also comprise mono-ethylenically unsaturated compounds, multi-ethylenically unsaturated compounds, or combinations thereof. A "mono-ethylenically unsaturated compound" refers to a compound comprising only one ethylenically unsaturated group, and a "multi-ethylenically unsaturated compound" refers to a compound comprising two or more ethylenically unsaturated groups.

The ethylenically unsaturated compounds can comprise a linear, branched, or cyclic compound. The term "linear" refers to a compound having a straight chain, the term "branched" refers to a compound having a chain with a hydrogen replaced by a substituent such as an alkyl group that branches or extends out from a straight chain, and the term "cyclic" refers to a closed ring structure. Further, the cyclic structures can comprise aromatic rings and/or aliphatic rings. As used herein, the term "aromatic" refers to a conjugated cyclic hydrocarbon structure with a stability (due to delocalization) that is significantly greater than that of a hypothetical localized structure. An aliphatic ring refers to a non-aromatic structure that contains saturated carbon bonds.

As indicated, the reactants that form the acid functional polyol polymer include an ethylenically unsaturated compound comprising acid functional groups or anhydrides thereof. The compound can comprise one or multiple acid groups or anhydrides thereof. The acid groups can comprise: carboxylic acid groups or anhydrides thereof and/or other acid groups (i.e., non-carboxylic acid groups) or anhydrides thereof.

Non-limiting examples of ethylenically unsaturated compounds comprising carboxylic acid functional groups, or the anhydride thereof, include (meth)acrylic acid, dimethylacrylic acid, ethylacrylic acid, allyl acetic acid, crotonic acid, vinyl acetic acid, itaconic acid, maleic acid, fumaric acid, itaconic anhydride, maleic anhydride, isobutenyl succinic anhydride, citraconic anhydride, and any combination thereof.

Non-limiting examples of ethylenically unsaturated compounds comprising non-carboxylic acid functional groups, or anhydrides thereof, include ethylenically unsaturated compounds comprising phosphorus acid functional groups, and ethylenically unsaturated compounds comprising sulfonic acid functional groups.

As used herein, "ethylenically unsaturated compounds comprising phosphorus acid functional groups" refers to compounds comprising at least one ethylenically unsaturated group and at least one phosphorus-containing acid group. A phosphorus-containing acid group means oxoacids of phosphorus, including, but not limited to, phosphorous acid and phosphoric acid. Examples of phosphorus-containing acid groups include, but are not limited to: phosphorous acid groups having —O—P(O)(H)(OH); and phosphoric acid groups having —O—P(O)(OH)$_2$.

Non-limiting examples of ethylenically unsaturated compounds comprising phosphorus acid functional groups include ethylenically unsaturated phosphate esters of polyether glycols and which comprise free phosphate acid functionality, such as a mono-ethylenically unsaturated phosphate ester of a polyether glycol. Non-limiting examples of a mono-ethylenically unsaturated phosphate ester of a polyether glycol and which comprise free phosphate acid functionality include phosphate esters of polypropylene glycol monomethacrylate and phosphate esters of polyethylene glycol monomethacrylate. Specific non-limiting examples of ethylenically unsaturated compounds comprising phosphorus acid functional groups include dihydrogen phosphate monomers such as 2-phosphoethyl (meth)acrylate, 2-phosphopropyl (meth)acrylate, 3-phosphopropyl (meth)acrylate, and combinations thereof. Non-limiting examples of commercially available ethylenically unsaturated compounds comprising phosphorus acid functional groups include the compounds commercially available from Solvay under the tradename SIPOMER® PAM 100, 200, 300, 400, and 500, and compounds commercially available from Harcros Chemicals such as under the tradename HARCRYL® 1228.

The ethylenically unsaturated compounds comprising phosphorus acid functional groups can also comprise the following structure:

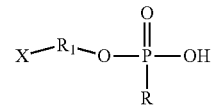

wherein $R_1$ comprises an organic linking group such as comprising an alkylene group. X is an ethlyenically unsaturated group such as a (meth)acrylate group. R comprises hydrogen, a hydroxyl group, an alkyl group, an aryl group, or a phosphoester group. A non-limiting example of such ethylenically unsaturated compounds comprise the above structure in which X is a (meth)acrylate group, $R_1$ is an alkylene group, and R is a hydroxyl group.

As used herein, an "alkyl group" refers to a linear, branched, and/or cyclic monovalent, saturated hydrocarbon radical. The alkyl group may include, but is not limited to, a linear or branched $C_1$-$C_{30}$ monovalent hydrocarbon radical, or a linear or branched $C_1$-$C_{20}$ monovalent hydrocarbon radical, or a linear or branched $C_1$-$C_{10}$ monovalent hydrocarbon radical, or a linear or branched $C_1$ to $C_6$ monovalent hydrocarbon radical, or a linear or branched $C_2$ to $C_4$ monovalent hydrocarbon radical, such as ethyl. The alkyl group may also include, but is not limited to, a cyclic $C_3$-$C_{19}$ monovalent hydrocarbon radical, or a cyclic $C_3$-$C_{12}$ monovalent hydrocarbon radical, or a cyclic $C_5$-$C_7$ monovalent hydrocarbon radical.

As used herein, an "aryl group" refers to a substituent derived from an aromatic ring, such as a phenyl group for example. The aryl group can be derived from a monocyclic aromatic ring, a bicyclic aromatic ring, or a polycyclic aromatic ring. The aryl group can also include a heteroaryl group in which at least one carbon atom of the aromatic group is replaced by a heteroatom such as nitrogen, oxygen, sulfur, or a combination thereof.

The term "alkylene" refers to a linear, branched, and/or cyclic divalent, saturated hydrocarbon radical. The alkylene group may include, but is not limited to, a linear or branched $C_1$-$C_{30}$ divalent hydrocarbon radical, or linear or branched $C_1$-$C_{20}$ divalent hydrocarbon radical, or linear or branched $C_1$-$C_{10}$ divalent hydrocarbon radical, or a linear or branched $C_1$ to $C_6$ divalent hydrocarbon radical, or a linear or branched $C_2$ to $C_4$ divalent hydrocarbon radical. The alkylene group may also include, but is not limited to, a cyclic $C_3$-$C_{19}$ divalent hydrocarbon radical, or a cyclic $C_3$-$C_{12}$ divalent hydrocarbon radical, or a cyclic $C_5$-$C_7$ divalent hydrocarbon radical.

As used herein, the term "phosphoester group" refers to an oxygen atom covalently bonded to an alkyl radical or an aryl radical, wherein the oxygen atom is also covalently bonded to a phosphorus atom that is bonded to an additional oxygen atom by a double bond.

The moiety comprising phosphorus acid groups if present on the acid functional polyol polymer may, for example, comprise the structure:

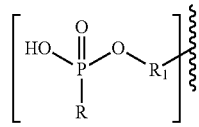

wherein R comprises hydrogen, hydroxyl, an alkyl, an aryl, or a phosphoester group, and $R_1$ comprises an organic linking group (for example, an alkylene group) terminating in a carbon atom that is covalently bonded to a carbon atom present in the polymer backbone.

A non-limiting example of an ethylenically unsaturated compound comprising sulfonic acid functional groups includes 2-acrylamido-2-methylpropane sulfonic acid.

The ethylenically unsaturated compound comprising acid functional groups, or the anhydride thereof, can comprise greater than 1 weight %, at least 3 weight %, or at least 5 weight %, based on the total solids weight of the reactants that form the acid functional polyol polymer. The ethylenically unsaturated compound comprising acid functional groups, or the anhydride thereof, can also comprise up to 20 weight %, up to 15 weight %, or up to 10 weight %, based on the total solids weight of the reactants that form the acid functional polyol polymer. The ethylenically unsaturated compound comprising acid functional groups, or the anhydride thereof, can comprise an amount within a range such as from 1 weight % to 20 weight %, or from 3 weight % to 15 weight %, or from 5 weight % to 10 weight %, based on the total solids weight of the reactants that form the acid functional polyol polymer.

When the ethylenically unsaturated compound comprising acid functional groups or the anhydride thereof is a carboxylic acid functional compound or anhydride thereof (such as (meth)acrylic acid), the amount of the compound can be within a range of greater than 1 weight % and less than 10 weight %, based on the total solids weight of the reactants that form the acid functional polyol polymer. For example, the carboxylic acid functional compound or anhydride thereof can comprise at least 2 weight %, at least 2.5 weight %, at least 3 weight %, at least 3.5 weight %, or at least 4 weight %, based on the total solids weight of the reactants that form the acid functional polyol polymer. The carboxylic acid functional compound or anhydride thereof can comprise 9 weight % or less, 8.5 weight % or less, 8 weight % or less, 7.5 weight % or less, 7 weight % or less, 6.5 weight % or less, or 6 weight % or less, based on the total solids weight of the reactants that form the acid functional polyol polymer. The carboxylic acid functional compound or anhydride thereof can comprise an amount within any of the end points previously described such as from 2 weight % to 9 weight %, or from 2.5 weight % to 8.5 weight %, or from 3 weight % to 8 weight %, or from 3.5 weight % to 7.5 weight %, or from 4 weight % to 7 weight %, or from 4 weight % to 6 weight %, based on the total solids weight of the reactants that form the acid functional polyol polymer.

The reactants that form the acid functional polyol polymer further include an ethylenically unsaturated compound comprising hydroxyl functional groups. The compound can comprise one or multiple hydroxyl groups. Non-limiting examples of ethylenically unsaturated compounds comprising hydroxyl functional groups include hydroxyalkyl esters of (meth)acrylic acid such as hydroxymethyl (meth)acrylate, hydroxyethyl (meth)acrylate, hydroxypropyl (meth)acrylate, hydroxybutyl (meth)acrylate, glyceryl (meth)acrylate, and combinations thereof.

The ethylenically unsaturated compound comprising hydroxyl functional groups can comprise at least 10 weight %, at least 15 weight %, at least 20 weight %, or at least 25 weight %, based on the total solids weight of the reactants that form the acid functional polyol polymer. The ethylenically unsaturated compound comprising hydroxyl functional groups can also comprise up to 50 weight %, or up to 45 weight %, based on the total solids weight of the reactants that form the acid functional polyol polymer. The ethylenically unsaturated compound comprising hydroxyl functional groups can comprise an amount within a range such as from 10 weight % to 50 weight %, or from 20 weight % to 50 weight %, or from 25 weight % to 45 weight %, based on the total solids weight of the reactants that form the acid functional polyol polymer.

As previously described, the reactants that form the acid functional polyol polymer further include an ethylenically unsaturated compound that is different from (i) and (ii). That is, the ethylenically unsaturated compound that is different from (i) and (ii) is selected from ethylenically unsaturated compounds that do not include acid and hydroxyl functional groups. The ethylenically unsaturated compound that is different from (i) and (ii) can include other functional groups, such as epoxy functional groups for example. Alternatively, the ethylenically unsaturated compound that is different from (i) and (ii) comprises a non-functional ethylenically unsaturated compound. As used herein, a "non-functional ethylenically unsaturated compound" refers to a compound that only contains ethylenically unsaturated groups and is free of all other reactive functional groups.

The ethylenically unsaturated compound that is different from (i) and (ii) can also comprise one or a combination of different types of ethylenically unsaturated compounds different from (i) and (ii). For example, the ethylenically unsaturated compound that is different from (i) and (ii) can comprise a mono-ethylenically unsaturated compound such as a non-functional mono-ethylenically unsaturated compound, a mono-ethylenically unsaturated compound having an abstractable hydrogen, or a combination hereof.

As used herein, an "abstractable hydrogen" refers to a hydrogen on a compound that is removed from the compound by a radical. Non-limiting examples of abstractable hydrogen atoms are hydrogen atoms bonded to tertiary carbon atoms such as the hydrogen atoms bonded to the tertiary carbons on 2-ethylhexyl acrylate and isobornyl acrylate. The reactants that form the acid functional polyol polymer can comprise one or multiple ethylenically unsaturated compounds having abstractable hydrogens. For instance, the reactants that form the acid functional polyol polymer can comprise a linear or branched mono-ethylenically unsaturated compound having an abstractable hydrogen and a cyclic mono-ethylenically unsaturated compound having an ab stractable hydrogen.

Non-limiting examples of suitable ethylenically unsaturated compounds that are different from (i) and (ii) include styrene, α-methyl styrene, 2,4-dimethylstyrene, ethylstyrene, isopropylstyrene, butylstyrene, vinyl naphthalene, vinyl toluene, ethylene, propylene, 1-butene, 1-pentene, 1-hexene, 1-octene, 1-octadecene, 3-methyl-1-butene, 4-methyl-1-pentene, cyclopentene, 1,4-hexadiene, 1,5-hexadiene, and divinylbenzene, methyl acrylate, methyl methacrylate, ethyl acrylate, ethyl methacrylate, butyl acrylate, butyl methacrylate, isobutyl acrylate, isobutyl methacrylate, isobornyl acrylate, isobornyl methacrylate, ethylhexyl acrylate, ethylhexyl methacrylate, lauryl methacrylate, lauryl acrylate, octyl acrylate, octyl methacrylate, glycidyl methacrylate, vinyl methacrylate, acetoacetoxyethyl methacrylate, acetoacetoxyethyl acrylate, acetoacetoxypropyl methacrylate, acetoacetopropryl acrylate, di-n-butyl maleate, di-octylmaleate, acrylonitrile, $C_3$-$C_{30}$ vinyl esters, $C_3$-$C_{30}$ vinyl ethers, and combinations thereof.

The ethylenically unsaturated compound that is different from (i) and (ii) can comprise at least 30 weight %, at least 40 weight %, or at least 50 weight %, based on the total solids weight of the reactants that form the acid functional polyol polymer. The ethylenically unsaturated compound that is different from (i) and (ii) can also comprise up to 70 weight %, or up to 65 weight %, based on the total solids weight of the reactants that form the acid functional polyol polymer. The ethylenically unsaturated compound that is different from (i) and (ii) can comprise an amount within a range such as from 30 weight % to 70 weight %, or from 40 weight % to 70 weight %, or from 50 weight % to 65 weight %, based on the total solids weight of the reactants that form the acid functional polyol polymer.

The acid functional polyol polymer can also be formed with other types of reactants, such as other ethylenically unsaturated compounds for example. Alternatively, the acid functional polyol polymer can be formed with only the previously described types of reactants.

The reactants can also be substantially free, essentially free, or completely free of polymerizable light stabilizers such as hindered amine light stabilizers, for example. The terms "substantially free of polymerizable light stabilizers" means that the reactants contain less than 1000 parts per million (ppm) of polymerizable light stabilizers such as hindered amine light stabilizers, "essentially free of polymerizable light stabilizers" means that the reactants contain less than 100 ppm of polymerizable light stabilizers such as hindered amine light stabilizers, and "completely free of polymerizable light stabilizers" means that the reactants contain less than 20 parts per billion (ppb) of polymerizable light stabilizers such as hindered amine light stabilizers.

The acid functional polyol polymer can be prepared by mixing and reacting all the desired reactants at the same time. Alternatively, the reactants can be reacted in a stepwise manner by first mixing and reacting only a portion of the reactants to form a preliminary reaction product and then mixing and reacting the remaining reactants with the preliminary reaction product. Various types of reaction aids can also be added to the reaction mixture including, but not limited to, polymerization initiators, chain transfer agents, and/or catalysts.

The reactants and other optional components can also be combined and reacted in a liquid medium such as a non-aqueous liquid medium. As used herein, the term "non-aqueous" refers to a liquid medium comprising less than 50 weight % water, based on the total weight of the liquid medium. In accordance with the present invention, such non-aqueous liquid mediums can comprise less than 40 weight % water, or less than 30 weight % water, or less than 20 weight % water, or less than 10 weight % water, or less than 5% water, based on the total weight of the liquid medium. The solvents that make up more than 50 weight % of the liquid medium include organic solvents. Non-limiting examples of suitable organic solvents include polar organic solvents e.g. protic organic solvents such as glycols, glycol ether alcohols, alcohols; and ketones, glycol diethers, esters, acetates, and diesters. Other non-limiting examples of organic solvents include aromatic and aliphatic hydrocarbons.

It is appreciated that the acid functional polyol polymer of the present invention is an addition polymer (for example a (meth)acrylate resin) that comprises acid and hydroxyl functional groups. As used herein, an "addition polymer" refers to a polymer at least partially derived from ethylenically unsaturated monomers. The polymer can also comprise other functional groups such as keto functional groups (also referred to as ketone functional groups), aldo functional groups (also referred to as aldehyde functional groups), amine groups, epoxide groups, thiol groups, carbamate groups, amide groups, urea groups, and combinations thereof. Alternatively, the polymer of the present invention can be free of any one or all of the additional functional groups other than the hydroxyl and acid functional groups.

The acid functional polyol polymer can have a hydroxyl value of at least 100 mg KOH/g, at least 110 mg KOH/g, at least 120 mg KOH/g, or at least 135 mg KOH/g. The acid functional polyol polymer can also have a hydroxyl value of 300 mg KOH/g or less, or 260 mg KOH/g or less, or 220 mg KOH/g or less, or 200 mg KOH/g or less, or 180 mg KOH/g or less, or 165 mg KOH/g or less. The acid functional polyol polymer can further have a hydroxyl value within a range such as, for example, of from 100 to 300 mg KOH/g, from 100 to 220 mg KOH/g, from 110 to 200 mg KOH/g, from 120 to 180 mg, or from 135 to 165 mg KOH/g.

The acid functional polyol polymer can have an acid value of greater than 9 mg KOH/g, greater than 10 mg KOH/g, at least 12.5 KOH/g, at least 15 KOH/g, at least 20 mg KOH/g, at least 25 mg KOH/g, or at least 30 mg KOH/g. The acid functional polyol polymer can also have an acid value of less than 60 mg KOH/g, 55 mg KOH/g or less, 50 mg KOH/g or less, 45 mg KOH/g or less, or 40 mg KOH/g or less. The acid functional polyol polymer can further have an acid value within a range such as, for example, of greater than 9 mg KOH/g and less than 60 mg KOH/g, or from 12.5 to 55 mg KOH/g, or from 15 to 50 mg KOH/g, or from 20 to 45 mg KOH/g, or from 20 to 40 mg KOH/g, or from 25 to 40 mg KOH/g, or from 30 to 40 mg KOH/g.

The ratio of the hydroxyl value to the acid value on the resin can be chosen with a range such as, for example, of greater than 2.5:1 to less than 16:1, or from 3:1 to 15:1, or from 3:1 to 12.5:1, or from 3.5:1 to 11:1.

Acid values and hydroxyl values are determined using a Metrohm 798 MPT Titrino automatic titrator according to ASTM D 4662-15 and ASTM E 1899-16.

It was found that the previously described acid values, hydroxyl values, and ratio of the hydroxyl value to the acid value of the resin can provide fast cure rates and other desirable properties, such as good appearance, when used in compositions to form the coatings described in further detail herein.

The acid functional polyol polymer can have glass transition temperature ($T_g$) of at least 0° C., at least 10° C., or at least 20° C. The acid functional polyol polymer can also have a Tg of up to 100° C., up to 80° C., or up to 60° C. The acid functional polyol polymer can further have a Tg within a range of from 0 to 100° C., or from 10 to 80° C., or from 20 to 60° C.

The Tg is determined using differential scanning calorimetry (DSC). During the Tg testing, a specimen of each sample is weighed and sealed in an aluminum hermetic pan and scanned twice in a TAI Discovery DSC from −70 to 200° C. at 20° C./min. The DSC is calibrated with indium, tin, and zinc standards, and the nominal nitrogen purge rate is 50 mL/min. The half-height glass transition temperatures (Tg) were determined by using two points and the peak areas were calculated using a linear baseline.

The acid functional polyol polymer can comprise a weight average molecular weight of at least 1,000 g/mol, or at least 5,000 g/mol. The acid functional polyol polymer can comprise a weight average molecular weight of up to 50,000 g/mol, up to 30,000 g/mol, or up to 15,000 g/mol. The acid functional polyol polymer can comprise a weight average molecular weight within a range of from 1,000 g/mol to 50,000 g/mol, or from 5,000 g/mol to 30,000 g/mol, or from 5,000 g/mol to 15,000 g/mol.

The weight average molecular weight is determined by Gel Permeation Chromatography using a Waters 2695 separation module with a Waters 410 differential refractometer (RI detector) and polystyrene standards in which tetrahydrofuran (THF) is used as the eluent at a flow rate of 1 ml/min and two PL Gel Mixed C columns used for separation.

The acid functional polyol polymer can comprise at least 25 weight % or at least 30 weight % of the coating composition, based on the total weight of the coating composition. The acid functional polyol polymer can comprise up to 70 weight %, up to 60 weight %, or up to 50 weight % of the coating composition, based on the total weight of the coating composition. The acid functional polyol polymer can comprise from 25 to 70 weight %, from 25 to 60 weight %, or from 30 to 50 weight % of the coating composition, based on the total weight of the coating composition.

As previously described, the coating composition comprises a non-aminoplast derived crosslinker(s) reactive with one or more functional groups of the acid functional polyol polymer. As used herein, the term "crosslinker" refers to a molecule comprising two or more functional groups that are reactive with other functional groups and which is capable of linking two or more monomers or polymer molecules through chemical bonds such as during a curing process. Further, "non-aminoplast derived" refers to a compound that is not derived from or comprising an aminoplast such as a melamine or melamine-formaldehyde resin. Thus, the coating composition comprises a crosslinker not derived from or comprising an aminoplast compound and which has functional groups reactive with at least some of the functional groups on the acid functional polyol polymer.

Non-limiting examples of non-aminoplast derived crosslinkers include isocyanates (including blocked isocyanates), aziridines, epoxy resins, anhydrides, alkoxysilanes, carbodiimides, polyhydrazides, polyamines, polyamides, and any combination thereof. For instance, the crosslinker can comprise an isocyanate.

The non-aminoplast derived crosslinker used with the present invention can comprise an equivalent ratio of hydroxyl-reactive functional groups to the hydroxyl functional groups on the acid functional polyol polymer within a range such as, for example, of from 0.5 to 1.5, or from 0.8 to 1.2. For instance, the non-aminoplast derived crosslinker can comprise isocyanate functional groups and the equivalent ratio of isocyanate functional groups on the non-aminoplast derived crosslinker to the hydroxyl functional groups on the acid functional polyol polymer can be within a range of from 0.5 to 1.5, or from 0.8 to 1.2.

The non-aminoplast derived crosslinker can comprise at least 2 weight % or at least 5 weight % of the coating composition, based on the total weight of the coating composition. The non-aminoplast derived crosslinker can comprise up to 30 weight % or up to 20 weight % of the coating composition, based on the total weight of the coating composition. The crosslinker can comprise from 2 to 30 weight % or from 5 to 20 weight % of the coating composition, based on the total weight of the coating composition.

The coating composition can further comprise a non-aqueous liquid medium. As previously defined, the non-aqueous liquid medium comprises one or more organic solvents that make up more than 50 weight % of the non-aqueous liquid medium. As such, the components that form the coating composition can be combined and mixed in a non-aqueous liquid medium and therefore form solvent-borne coating compositions.

The coating composition can also comprise additional components. For example, the coating composition can also comprise additional film-forming resins. The additional resins can include any of a variety of thermoplastic and/or thermosetting resins known in the art. As used herein, the term "thermosetting" refers to resins that "set" irreversibly upon curing or crosslinking, wherein the polymer chains are joined together by covalent bonds. This property is usually associated with a cross-linking reaction often induced, for example, by heat or radiation. Curing or crosslinking reactions also may be carried out under ambient conditions. Once cured, a thermosetting resin will not melt upon the application of heat and is insoluble in solvents. As noted, the additional resins can also include a thermoplastic resin. As used herein, the term "thermoplastic" refers to resins that include polymeric components that are not joined by covalent bonds and, thereby, can undergo liquid flow upon heating.

The additional resins can be selected from, for example, polyurethanes, polyester polymers, polyamide polymers, polyether polymers, polysiloxane polymers, epoxy resins, copolymers thereof, and mixtures thereof. Thermosetting resins typically comprise reactive functional groups. The reactive functional groups can include, but are not limited to, amine groups, epoxide groups, alkoxy groups, hydroxyl groups, thiol groups, carbamate groups, amide groups, urea groups, and combinations thereof.

Thermosetting resins are typically reacted with a crosslinker. As such, when additional film-forming resins are used in the coating composition, the additional film-forming resins can be reacted with additional crosslinkers and/or the non-aminoplast derived crosslinker that is also reactive with the acid functional polyol polymer. Non-limiting examples of such crosslinkers include any of the crosslinkers previously described. The thermosetting resins can also have functional groups that are reactive with themselves; in this manner, such resins are self-crosslinking.

The coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof.

Example dyes include, but are not limited to, those that are solvent and/or aqueous based such as phthalo green or blue, iron oxide, bismuth vanadate, anthraquinone, perylene and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of components that can be used with the coating compositions of the present invention include plasticizers, abrasion resistant particles, fillers including, but not limited to, micas, talc, clays, and inorganic minerals, anti-oxidants, hindered amine light stabilizers, UV light absorbers and stabilizers, surfactants, flow and surface control agents, thixotropic agents, reactive diluents, reaction inhibitors, corrosion-inhibitors, and other customary auxiliaries.

The coating composition can also be substantially free, essentially free, or completely free of an external catalyst. As used herein, an "external catalyst" refers to a separate component added to a composition that increases the reaction rate between other components, such as the reaction rate between a film-forming resin and crosslinker to form a coating. Non-limiting examples of external catalysts include external metal catalysts such as tin, external acid catalysts such as 2-ethyl hexanoic acid and phosphoric acid, base catalysts such as amines, and combinations thereof. Further, the terms "substantially free of external catalyst" means that the coating composition contains less than 1000 parts per million (ppm) of external catalyst, "essentially free of external catalyst" means that the coating composition contains less than 100 ppm of external catalyst, and "completely free of external catalyst" means that the coating composition contains less than 20 parts per billion (ppb) of external catalyst. The amount is based on the total weight of the coating composition.

After forming the coating composition of the present invention, the composition can be applied to a wide range of substrates known in the coatings industry. For example, the coating composition of the present invention can be applied to automotive substrates (e.g. automotive vehicles including but not limited to cars, buses, trucks, trailers, etc.), industrial substrates, aircraft and aircraft components, marine substrates and components such as ships, vessels, on-shore and off-shore installations, storage tanks, windmills, nuclear plants, packaging substrates, wood flooring and furniture, apparel, electronics, including housings and circuit boards, glass and transparencies, sports equipment, including golf balls, stadiums, buildings, bridges, and the like. These substrates can be, for example, metallic or non-metallic.

Metallic substrates include, but are not limited to, tin, steel (including electrogalvanized steel, cold rolled steel, hot-dipped galvanized steel, steel alloys or blasted/profiled steel, among others), aluminum, aluminum alloys, zinc-aluminum alloys, steel coated with a zinc-aluminum alloy, and aluminum plated steel. As used herein, blasted or profiled steel refers to steel that has been subjected to abrasive blasting and which involves mechanical cleaning by continuously impacting the steel substrate with abrasive particles at high velocities using compressed air or by centrifugal impellers. The abrasives are typically recycled/reused materials and the process can efficiently removal mill scale and rust. The standard grades of cleanliness for abrasive blast cleaning is conducted in accordance with BS EN ISO 8501-1.

Further, non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethylene terephthalate) (PET), polycarbonate, polycarbonate acrylobutadiene styrene (PC/ABS), polyamide, composites including fiber glass or carbon fiber in a polymer matrix, wood, veneer, wood composite, particle board, medium density fiberboard, cement, stone, glass, paper, cardboard, textiles, leather both synthetic and natural, and the like.

The coating compositions of the present invention can be applied by any means standard in the art, such as electrocoating, spraying, electrostatic spraying, dipping, rolling, brushing, and the like. The coatings formed from the coating compositions of the present invention can be applied to a dry film thickness of from 10 to 100 microns, or from 20 to 60 microns.

The coating composition can be applied to a substrate to form a monocoat. As used herein, a "monocoat" refers to a single layer coating system that is free of additional coating layers. Thus, the coating composition comprising the corrosion inhibitor can be applied directly to a substrate without any intermediate coating layer and cured to form a single layer coating, i.e. a monocoat. The coating composition can also be applied directly over a pretreated substrate as a monocoat. For example, the substrate can be pretreated with an iron phosphate treatment, zinc phosphate treatment, zirconium treatment, titanium treatment, or silane treatment.

Alternatively, the coating composition can be applied to a substrate as a first coating layer along with additional coating layers, such as a second coating layer, to form a multi-layer coating system. It is appreciated that the multi-layer coating can comprise multiple coating layers such as three or more, or four or more, or five or more, coating layers. For example, the previously described coating composition of the present invention can be applied to a substrate as a primer and second and third coating layers, and optionally additional coating layers, can be applied over the primer layer as basecoats and/or topcoats. The previously described coating composition of the present invention can also be applied as a basecoat over a primer layer and/or as a topcoat over a basecoat layer. The previously described coating composition of the present invention can also be applied as an after-market coating of a previously applied coating layer such as to repair or refinish a previously coated substrate.

As used herein, a "primer" refers to a coating composition from which an undercoating may be deposited onto a substrate in order to prepare the surface for application of a protective or decorative coating system. A "basecoat" refers to a coating composition from which a coating is deposited onto a primer and/or directly onto a substrate, optionally including components (such as pigments) that impact the color and/or provide other visual impact, and which may be overcoated with a protective and decorative topcoat.

The coating layer or layers, such as a topcoat layer, can be a clear layer. As used herein, a "clear coating layer" refers to a coating layer that is at least substantially transparent or fully transparent. The term "substantially transparent" refers to a coating wherein a surface beyond the coating is at least partially visible to the naked eye when viewed through the coating. The term "fully transparent" refers to a coating wherein a surface beyond the coating is completely visible to the naked eye when viewed through the coating. It is appreciated that the clear layer can comprise colorants, such as pigments, provided that the colorants do not interfere with the desired transparency of the clear topcoat layer. Alternatively, the clear layer is free of colorants such as pigments (i.e., unpigmented).

The additional coating layers, such as a second and third coating layer, can be formed from a coating composition that includes a film-forming resin that is the same or different from the previously described coating layer. The additional coating layers can be prepared with any of the film-forming resins, crosslinkers, colorants, and/or other components previously described. Further, each coating composition can be applied as a dry-on-dry process where each coating composition is dried or cured to form a coating layer prior to application of another coating composition. Alternatively, all or certain combinations of each coating composition described herein can be applied as a wet-on-wet process and dried or cured together. The multi-layer coatings can also be prepared with a primer layer, a first basecoat, a second basecoat, and a topcoat in which at least one of the layers are prepared from the coating composition of the present invention previously described.

It was found that the coating composition can be cured at low temperatures to form a coating with desirable properties. For example, the coating composition can be cured at temperatures of less than 80° C., or 70° C. or less, or 60° C. or less. For example, the coating composition of the present invention can be cured without an external catalyst at a temperature within a range of from 10° C. to less than 80° C., or from 10° C. to 70° C., or from 50° C. to 70° C., or from 20° C. to 70° C., or from 20° C. to 60° C. The coating composition can be cured at the previously described temperatures in a period of time of 4 hours or less, or 3 hours or less, or 2 hours or less, or 1 hour or less, or 30 minutes or less, or 20 minutes or less.

The present invention is also directed to a method of forming a coating over at least a portion of a substrate. The method includes applying the previously described coating composition of the present invention over at least a portion of a substrate and curing the coating composition to form a coating over at least of portion of the substrate. The coating composition is cured at temperatures of less than 80° C., or 70° C. or less, or 60° C. or less. For example, the coating composition of the present invention can be cured without an external catalyst at any of the previously described temperatures such as within a range of from 10° C. to less than 80° C., or from 10° C. to 70° C., or from 50° C. to 70° C., or from 20° C. to 70° C., or from 20° C. to 60° C. The coating composition can be cured at the previously described temperatures in a period of time of 4 hours or less, or 3 hours or less, or 2 hours or less, or 1 hour or less, or 30 minutes or less, or 20 minutes or less.

It was found that the coating composition of the present invention can cure rapidly at low temperatures in the absence of an external catalyst such as at temperatures previously described. The coating compositions of the present invention also provides comparable or better lifetimes and cure speeds as compared to coating compositions that contain external catalysts. The coatings formed from the coating compositions have also been found to provide good solvent resistance and harder films as compared to coatings formed from coating compositions that included external catalysts such as external metal, acid, and amine catalysts, for example. The coatings formed from the coating compositions can further provide other desirable properties such as good appearance.

The present invention is also directed to the following aspects.

A first aspect is directed to a coating composition comprising: (a) an acid functional polyol polymer comprising an acid value of greater than 9 mg KOH/g and less than 60 mg KOH/g, and a hydroxyl value of from 100 to 300 mg KOH/g; (b) a non-aminoplast derived crosslinker reactive with the acid functional polyol polymer; and (c) a non-aqueous liquid medium, wherein an equivalent ratio of functional groups on the crosslinker reactive with hydroxyl functional groups to hydroxyl functional groups on the acid functional polyol polymer is within a range of from 0.5 to 1.5, and wherein the coating composition is substantially free of an external catalyst, such as an external metal catalyst, acid catalyst, and/or amine catalyst, and the coating composition cures at a temperature of less than 80° C.

A second aspect is directed to the coating composition of the first aspect, wherein the acid functional polyol polymer is obtained from reactants comprising: (i) an ethylenically unsaturated compound comprising acid functional groups, or an anhydride thereof; (ii) an ethylenically unsaturated compound comprising hydroxyl functional groups; and (iii) an ethylenically unsaturated compound that is different from (i) and (ii).

A third aspect is directed to the coating composition of the second aspect, wherein the ethylenically unsaturated compound comprising acid functional groups comprises: carboxylic acid functional groups, or the anhydride thereof; phosphorus acid functional groups; sulfonic acid functional groups; or any combination thereof.

A fourth aspect is directed to the coating composition of the third aspect, wherein the ethylenically unsaturated compound comprising acid functional groups comprises carboxylic acid functional groups, or the anhydride thereof.

A fifth aspect is directed to the coating composition of the fourth aspect, wherein the ethylenically unsaturated compound comprising carboxylic acid functional groups, or an anhydride thereof, comprises an amount within a range of greater than 1 weight % and less than 10 weight %, based on the total solids weight of the reactants that form the acid functional polyol polymer.

A sixth aspect is directed to the coating composition of any one of the second through fifth aspects, wherein the ethylenically unsaturated compound comprising hydroxyl functional groups comprises an amount within a range of from 10 weight % to 50 weight % based on the total solids weight of the reactants that form the acid functional polyol polymer.

A seventh aspect is directed to the coating composition of any one of the second through seventh aspects, wherein the ethylenically unsaturated compound that is different from (i) and (ii) comprises greater than 20 weight % based on the total solids weight of the reactants that form the acid functional polyol polymer.

An eighth aspect is directed to the coating composition of any one of the previous aspects, wherein the crosslinker comprises an isocyanate, epoxide, aziridine, anhydride, alkoxysilane, or any combination thereof.

A ninth aspect is directed to the coating composition of the eighth aspect, wherein the crosslinker comprises an isocyanate.

A tenth aspect is directed to the coating composition of any one of the previous aspects, wherein the acid functional polyol polymer has a weight average molecular weight of greater than 1,000 g/mol.

An eleventh aspect is directed to the coating composition of any one of the previous aspects, wherein the ratio of the hydroxyl value to the acid value on the acid functional polyol polymer is selected within a range of greater than 2.5:1 and less than 16:1.

A twelfth aspect is directed to the coating composition of any one of the previous aspects, wherein the acid functional polyol polymer has a glass transition temperature of at least 0° C.

A thirteenth aspect is directed to the coating composition of any one of the previous aspects, wherein the acid functional polyol polymer comprises at least 25 weight % of the coating composition based on the total weight of the coating composition.

A fourteenth aspect is directed to a substrate at least partially coated with a coating formed from the coating composition of any one of the previous aspects.

A fifteenth aspect is directed to the substrate of the fourteenth aspect, wherein the coating composition is applied directly over at least a portion of the substrate.

A sixteenth aspect is directed to the substrate of fourteenth or fifteenth aspect, wherein the coating composition is applied over at least a portion of a different coating layer formed over at least a portion of the substrate.

A seventeenth aspect is directed to the substrate of any one of the fourteenth through sixteenth aspects, wherein the substrate is a metal.

An eighteenth aspect is directed to the substrate of any one of the fourteenth through seventeenth aspects, wherein the substrate forms at least a portion of a vehicle.

A nineteenth aspect is directed to a method of forming a coating over at least a portion of a substrate comprising: applying the coating composition according to any one of the first through thirteenth aspects over at least a portion of a substrate; and curing the coating composition at a temperature of less than 80° C. to form a coating over at least of portion of the substrate.

A twentieth aspect is directed to the method of the nineteenth aspect, wherein the coating composition is cured at a temperature of less 60° C. to form a coating over at least of portion of the substrate.

The following examples are presented to demonstrate the general principles of the invention. The invention should not be considered as limited to the specific examples presented. All parts and percentages in the examples are by weight unless otherwise indicated.

Example 1

Preparation of Polymers

Various polymers were prepared from the components listed in Table 1. The amounts of each component are based on parts-by-weight.

TABLE 1

| No. | Component | Resin A | Resin B | Resin C | Resin D | Resin E |
|---|---|---|---|---|---|---|
| 1 | SOLVESSO ™ 100 [1] | 121.99 | 121.99 | 121.99 | 121.99 | 122.0 |
| 2 | Xylene | 214.06 | 214.06 | 214.06 | 214.06 | 214.1 |
| 3 | Hydroxypropyl acrylate | 141.12 | 141.12 | 141.12 | 141.12 | 141.1 |
| 4 | Hydroxyethyl methacrylate | 286.85 | 286.85 | 286.85 | 286.85 | 286.9 |
| 5 | Styrene | 340.35 | 312.14 | 368.56 | 340.35 | 362.9 |
| 6 | N-butyl methacrylate - inhibited | 286.95 | 263.16 | 310.73 | 286.95 | 306.0 |
| 7 | Butyl acrylate | 117.04 | 107.34 | 126.74 | 117.04 | 124.8 |
| 8a | Methacrylic acid | 61.70 | 123.40 | 0 | 0 | 12.3 |
| 8b | Acrylic acid | 0 | 0 | 0 | 61.70 | 0 |
| 9 | Tertiary dodecyl mercaptan | 6.47 | 6.47 | 6.47 | 6.47 | 6.5 |
| 10 | Xylene | 39.27 | 39.27 | 39.27 | 39.27 | 39.3 |
| 11 | SOLVESSO ™ 100 [1] | 31.07 | 31.07 | 31.07 | 31.07 | 31.1 |
| 12 | LUPEROX ® 270 [2] | 86.31 | 86.31 | 86.31 | 86.31 | 86.3 |
| 13 | SOLVESSO ™ 100 [1] | 37.83 | 37.83 | 37.83 | 37.83 | 37.8 |
| 14 | Xylene | 47.76 | 47.76 | 47.76 | 47.76 | 47.8 |
| 15 | LUPEROX ® 270 [2] | 9.93 | 9.93 | 9.93 | 9.93 | 9.9 |
| 16 | SOLVESSO ™ 100 [1] | 16.69 | 16.69 | 16.69 | 16.69 | 16.7 |
| 17 | Xylene | 66.32 | 66.32 | 66.32 | 66.32 | 66.3 |
| 18 | Butyl acetate | 88.33 | 88.33 | 88.33 | 88.33 | 88.3 |

[1] Aromatic hydrocarbon fluid, commercially available from ExxonMobil Chemical.
[2] Peroxyester polymerization initiator, commercially available from Arkema.

Hydroxy-containing acid-functional polymers A-E were prepared by first mixing components 1-2 in a flask set up for total reflux with stirring under nitrogen. The mixture was sparged with nitrogen for 45 min while heating to a temperature of 146° C. Once the temperature was established, a mixture of components 3-11 was added slowly over the period of 3 h 35 min under nitrogen. Simultaneously, a mixture of components 12-14 was introduced over the period of 3 h 30 min, and the reaction mixture was held at temperature for 1 h. A mixture of components 15-16 was then introduced over a period of 30 min followed by a solvent rinse using components 17-18. The reaction mixture was then held for 90 min, allowed to cool down to ambient temperature, and discharged.

An additional polymer was also prepared from the components listed in Table 2. The amounts of each component are based on parts-by-weight.

TABLE 2

| No. | Component | Resin F |
|---|---|---|
| 1 | Methyl isobutyl ketone | 750 |
| 2 | Isobornyl methacrylate | 450 |
| 3 | Styrene | 450 |
| 4 | 2-ethylhexyl acrylate | 180 |
| 5 | Tertiary dodecyl mercaptan | 10.8 |
| 6 | PAM 200 [3] | 90 |
| 7 | Tone M201 [4] | 360 |
| 8 | LUPEROX ® 575 [5] | 54.3 |
| 9 | Methyl isobutyl ketone | 410 |
| 10 | LUPEROX ® 575 [5] | 5.4 |
| 11 | Methyl isobutyl ketone | 95 |
| 12 | Methyl isobutyl ketone | 50 |
| 13 | Methyl isobutyl ketone | 50 |

[3] Phosphate esters of polypropylene glycol monomethacrylate, commercially available from Solvay.
[4] Reaction product of one mole of hydroxyethyl methacrylate and one mole of caprolactone commercially available from Dow.
[5] t-amyl polymerization initiator, commercially available from Arkema.

The hydroxy-containing acid-functional polymer F was prepared by first adding component 1 in a flask to set up for total reflux with stirring under nitrogen. Once the temperature was established, a mixture of components 8 and 9 was added slowly over the period of 3 h 35 min under nitrogen. Five minutes later, a mixture of components 2-7 was introduced over the period of 3 h 30 min. After this time, component 12 was added and the reaction mixture was held at temperature for 1 h. A mixture of components 10 and 11 was then introduced over a period of 30 min followed by a solvent rinse using component 13. The reaction mixture was then held for 90 min, allowed to cool down to ambient temperature, and discharged.

The resulting resins were measured for various properties. The properties are listed in Table 3.

TABLE 3

| Resin | Mw [6] (g/mol) | Mn [6] (g/mol) | Mz [6] (g/mol) | Hydroxyl value[7] (mg KOH/g) | Acid value[7] (mg KOH/g) | Tg[8] (° C.) |
|---|---|---|---|---|---|---|
| Resin A | 9696 | 1811 | 30237 | 148 | 31.9 | 13 |
| Resin B | 8656 | 2639 | 18719 | 154 | 60.4 | 13 |
| Resin C | 7000 | 2877 | 12513 | 147 | 2.6 | 6 |
| Resin D | 11576 | 3314 | 26231 | 139 | 35.9 | N/A |
| Resin E | N/A | N/A | N/A | 144 | 8.6 | 20 |
| Resin F | 8653 | 2220 | N/A | 130 | 12 | 26 |

[6] The weight average molecular weight (Mw), number average molecular weight (Mn), and average molecular weight (Mz) was determined by Gel Permeation Chromatography using a Waters 2695 separation module with a Waters 410 differential refractometer (RI detector) and polystyrene standards. Tetrahydrofuran (THF) was used as the eluent at a flow rate of 1 ml/min, and two PL Gel Mixed C columns were used for separation.
[7] Acid values and hydroxyl values were determined using a Metrohm 799 GPT Tritrino automatic titrator according to ASTM D4662-15 and ASTM E 1899-16.
[8] The glass transition value (Tg) was determined using differential scanning calorimetry (DSC). During the Tg testing, a specimen of each sample was weighed and sealed in an aluminum hermetic pan and scanned twice in a TAI Discovery DSC from −70 to 200° C. at 20° C./min. The DSC was calibrated with indium, tin, and zinc standards, and the nominal nitrogen purge rate was 50 mL/min. The half-height glass transition temperatures (Tg) were determined by using two points and the peak areas were calculated using a linear baseline.

Examples 2-9

Preparation of Coating Compositions

Various coating compositions were prepared from the components listed in Table 4.

TABLE 4

| Component | Ex. 2 (g) | Comp. Ex. 3 (g) | Comp. Ex. 4 (g) | Comp. Ex. 5 (g) | Comp. Ex. 6 (g) | Ex. 7 (g) | Comp. Ex. 8 (g) | Ex. 9 (g) |
|---|---|---|---|---|---|---|---|---|
| Resin A | 32.9 | 0 | 0 | 0 | 0 | 0 | 0 | 0 |
| Resin B | 0 | 31.34 | 0 | 0 | 0 | 0 | 0 | 0 |
| Resin C | 0 | 0 | 33.6 | 33.6 | 33.6 | 0 | 0 | 0 |
| Resin D | 0 | 0 | 0 | 0 | 0 | 33.0 | 0 | 0 |
| Resin E | 0 | 0 | 0 | 0 | 0 | 0 | 33.0 | |
| Resin F | 0 | 0 | 0 | 0 | 0 | 0 | 0 | 33.0 |
| Methyl isobutyl ketone | 10.8 | 11.0 | 10.8 | 10.8 | 12.4 | 10.69 | 10.7 | 7.4 |
| Methyl ether propylene glycol | 9.7 | 9.9 | 9.7 | 9.7 | 11.1 | 9.6 | 9.65 | 6.6 |
| Xylene | 21.9 | 22.3 | 21.9 | 21.9 | 25.1 | 21.7 | 21.8 | 15.0 |
| Acetone | 5.93 | 6.0 | 5.9 | 5.9 | 6.8 | 5.9 | 5.9 | 4.1 |
| Methyl amyl ketone | 5.4 | 5.5 | 5.4 | 5.4 | 6.2 | 5.3 | 5.4 | 3.7 |
| BYK ® -300 [9] | 0.2 | 0.2 | 0.2 | 0.2 | 0.2 | 0.2 | 0.2 | 0.1 |
| CHIGUARD ® 328 [10] | 0.5 | 0.5 | 0.5 | 0.5 | 0.5 | 0.5 | 0.5 | 0.4 |
| TINUVIN ® 123 [11] | 0.7 | 0.7 | 0.7 | 0.7 | 0.7 | 0.7 | 0.7 | 0.5 |
| DESMODUR ® N 3300 [12] | 12.2 | 12.8 | 11.6 | 11.6 | 11.5 | 11.4 | 11.9 | 8.22 |
| dibutyl tin dilaurate | 0 | 0 | 0 | 0.04 | 0 | 0 | 0 | 0 |
| 2-ethyl hexanoic acid | 0 | 0 | 0 | 0 | 4.27 | 0 | 0 | 0 |

[9] Surface additive containing a solution of a polyether modified polydimethylsiloxane, commercially available from BYK.
[10] UV absorber (2-(3',5'-di-t-amyl-2'-hydroxyphenyl)benzotriazole), commercially available from Chitec Technology.
[11] A liquid hindered amine light stabilizer (HALS) based on an amino-ether functionality, commercially available from BASF.
[12] Aliphatic polyisocyanate (HDI trimer), commercially available from Covestro.

The coating compositions of Examples 2-9 were prepared by mixing the components listed in Table 4 while monitoring their viscosities hourly. The time to double viscosity is an estimate of a coating's usable lifetime, with faster times being more desirable. Table 5 shows the time to double viscosity for Examples 2-9.

TABLE 5

| Composition | Time to double viscosity (hour after mixing) |
|---|---|
| Example 2 | 2 |
| Comparative Example 3 | 1 |
| Comparative Example 4 | >24 |
| Comparative Example 5 | 1 |
| Comparative Example 6 | 5-24 |
| Example 7 | 1 |
| Comparative Example 8 | >24 |
| Example 9 | <1 |

As shown in Table 5, the coating composition of Examples 2, 7, and 9 of the present invention exhibited similar lifetimes as the coating composition of Comparative Example 5 that contained a tin catalyst. The compositions of Examples of 2, 7, and 9 of the present invention also exhibited better lifetimes as compared to Comparative Example 4 (uncatalyzed) and Comparative Example 6 (catalyzed with an external acid catalyst).

The compositions of Examples of 2, 7, and 9 of the present invention further exhibited better lifetimes as compared to Comparative Example 8, which was prepared with resin E having an acid value of 8.6 mg KOH/g.

Example 10

Application and Evaluation of Coatings

The coating compositions of Examples 2-7 and 9 were applied to ED6450 HE electrocoated HIA Zn/Fe substrates, available from ACT, using a drawdown bar with an 8 mil gap available from BYK. After drawdown, the compositions were allowed to sit at room temperature for 40 minutes.

The coating composition of Example 8 was applied via hand spray application using a SATA 1.3 mm tip HVLP applicator at a film thickness of 2-2.5 mil over a cold rolled steel substrate previously coated with ED6060 electrocoat (available from ACT), Delfleet Evolution F3993 primer (available from PPG), and Envirobase High Performance T409 basecoat (available from PPG).

The resulting coatings were measured for solvent resistance via double rubs with methyl ethyl ketone. The testing was conducted according to a modified version of ASTM D 5402-15 by placing each coated panel coating side up on a flat surface. A cotton tipped applicator saturated with MEK was then rubbed on the panels using maximum pressure in a forward and backward motion covering a strip approximately three inches in length. One "double rub" was performed as a complete forward and backward motion. The number of double rubs (maximum 100) were recorded to break through the top layer.

The hardness of the coatings were measured by the Koenig Pendulum test. The testing was conducted using a modified version of ASTM D4366-16 by placing each coated panel on the table of a stand (towards the top of the equipment) with the paint film uppermost. The fulcrum balls of the pendulum were cleaned by wiping with a soft tissue wetted with solvent and allowed to dry thoroughly before lowering them gently on to the test panel. The pendulum was deflected without lateral displacement of the fulcrum to 6° and allowed to rest against the stop on the stand. The pendulum was released while simultaneously starting the counter. The time for the oscillations to fall to 3° was recorded. The test was performed at ambient lab conditions, generally 22° C. at 30-60% relative humidity.

Appearance of the final coating was determined using a Wavescan reading (BYK-Gardner GmbH). The appearance was evaluated using a Wa rating. During the testing, increased texture results in increased light scattering and perceived decreased appearance quality. This texture can be approximated by waves with wavelengths of less than 0.1 mm to greater than 30 mm. The Wa metric is the amount of light scattered from texture with wavelengths from 0.1-0.3 mm. Wa values of 20 or less can be considered acceptable.

The ratio of the hydroxyl value to the acid value on the resin were also calculated.

The results of the testing are shown in Table 6. The previously described acid values of the resins are also reproduced below.

TABLE 6

| Composition | Acid value of resin | Ratio of hydroxyl value to acid value on resin | Time to reach 100 MEK double rubs (hours after application) | Appearance 7 days after application (Wa) | Koenig pendulum hardness (1 day after application; time in seconds) |
|---|---|---|---|---|---|
| Example 2 | 31.9 | 4.6 | 4 | 16 | 104 |
| Comparative Example 3 | 60.4 | 2.5 | 1 | 42 | 137 |
| Comparative Example 4 | 2.6 | 56 | 5-24 | 2 | 45 |
| Comparative Example 5 | 2.6 | 56 | 1 | 8 | 68 |
| Comparative Example 6 | 2.6 | 56 | 5-24 | N/A | 32 |
| Example 7 | 35.9 | 3.9 | 3 | N/A | 156 |
| Comparative Example 8 | 8.6 | 16.7 | 5-24 | 13 | 80 |
| Example 9 | 12 | 10.8 | 6 | N/A | 143 |

As shown in Table 6, coatings formed from the compositions of Examples 2, 7, and 9 of the present invention exhibited fast cure speeds that are similar to the cure speeds to the coating formed with the tin catalyst of Comparative Example 5. The coatings formed from the compositions of Examples of 2, 7, and 9 of the present invention also exhibited faster cure speeds as compared to Comparative Example 4 (uncatalyzed) and Comparative Example 6 (catalyzed with an external acid catalyst).

Moreover, the coatings formed from the compositions of Examples of 2, 7, and 9 of the present invention exhibited faster cure speeds as compared to Comparative Example 8, which was prepared with a resin having acid an value of 8.6 mg KOH/g, and a ratio of the hydroxyl value to the acid value on the resin of 16.7. Further, the coatings formed from the compositions of Example 2 of the present invention exhibited better appearance as compared to Comparative Example 3, which was prepared with a resin having acid an value of 60.4 mg KOH/g, and a ratio of the hydroxyl value to the acid value on the resin of about 2.5.

As further shown in Table 6, coatings formed from the compositions of Examples 2, 7, and 9 of the present invention also exhibited better hardness as compared to coatings formed from the compositions of Comparative Examples 4-6 and 8.

In addition, it is appreciated that the amount of acid monomer used to form the resin can also be selected to provide improved and desired properties. For instance, comparative Example 3 was prepared with a resin formed with 10 weight % of methacrylic acid and exhibited poor appearance, while comparative Example 8 was prepared with a resin formed with 1 weight % of methacrylic acid and cured too slow. In contrast, inventive example 2 was prepared with 5 weight % of methacrylic acid and exhibited good appearance and fast cure speeds.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition comprising:
   (a) an acid functional polyol polymer having a number average molecular weight of at least 2220, comprising an acid value of greater than 9 mg KOH/g and less than 60 mg KOH/g, and a hydroxyl value of from 100 to 300 mg KOH/g;
   (b) a non-aminoplast derived crosslinker reactive with the acid functional polyol polymer; and
   (c) a non-aqueous liquid medium,
   wherein an equivalent ratio of functional groups on the crosslinker reactive with hydroxyl functional groups to hydroxyl functional groups on the acid functional polyol polymer is within a range of from 0.5 to 1.5, and wherein the coating composition is substantially free of an external catalyst, and the coating composition cures at a temperature of less than 80° C.

2. The coating composition of claim 1, wherein the acid functional polyol polymer is obtained from reactants comprising:
   (i) an ethylenically unsaturated compound comprising acid functional groups, or an anhydride thereof;
   (ii) an ethylenically unsaturated compound comprising hydroxyl functional groups; and
   (iii) an ethylenically unsaturated compound that is different from (i) and (ii).

3. The coating composition of claim 2, wherein the ethylenically unsaturated compound comprising acid functional groups comprises: carboxylic acid functional groups, or the anhydride thereof; phosphorus acid functional groups; sulfonic acid functional groups; or any combination thereof.

4. The coating composition of claim 3, wherein the ethylenically unsaturated compound comprising acid functional groups comprises the carboxylic acid functional groups, or the anhydride thereof.

5. The coating composition of claim 4, wherein the ethylenically unsaturated compound comprising carboxylic acid functional groups, or the anhydride thereof, comprises an amount within a range of greater than 1 weight % and less than 10 weight %, based on the total solids weight of the reactants that form the acid functional polyol polymer.

6. The coating composition of claim 2, wherein the ethylenically unsaturated compound comprising hydroxyl functional groups comprises an amount within a range of from 10 weight % to 50 weight %, based on the total solids weight of the reactants that form the acid functional polyol polymer.

7. The coating composition of claim 2, wherein the ethylenically unsaturated compound that is different from (i) and (ii) comprises greater than 20 weight % based on the total solids weight of the reactants that form the acid functional polyol polymer.

8. The coating composition of claim 1, wherein the crosslinker comprises an isocyanate, epoxide, aziridine, anhydride, alkoxysilane, or any combination thereof.

9. The coating composition of claim 1, wherein the crosslinker comprises an isocyanate.

10. The coating composition of claim 1, wherein the acid functional polyol polymer has a weight average molecular weight of greater than 1,000 g/mol.

11. The coating composition of claim 1, wherein the ratio of the hydroxyl value to the acid value on the acid functional polyol polymer is within a range of greater than 2.5:1 and less than 16:1.

12. The coating composition of claim 1, wherein the acid functional polyol polymer has a glass transition temperature of at least 0° C.

13. The coating composition of claim 1, wherein the acid functional polyol polymer comprises at least 25 weight % of the coating composition, based on the total weight of the coating composition.

14. A substrate at least partially coated with a coating formed from the coating composition of claim 1.

15. The substrate of claim 14, wherein the coating composition is applied directly over at least a portion of the substrate.

16. The substrate of claim 14, wherein the coating composition is applied over at least a portion of a different coating layer formed over at least a portion of the substrate.

17. The substrate of claim 14, wherein the substrate is a metal.

18. The substrate of claim 17, wherein the substrate forms at least a portion of a vehicle.

19. A method of forming a coating over at least a portion of a substrate comprising:
   applying the coating composition according to claim 1 over at least a portion of a substrate; and
   curing the coating composition at a temperature of less than 80° C. to form a coating over at least a portion of the substrate.

20. The method of claim 19, wherein the coating composition is cured at a temperature of less 60° C. to form a coating over at least a portion of the substrate.

21. The method of claim 19, wherein the crosslinker comprises an isocyanate, epoxide, aziridine, anhydride, alkoxysilane, or any combination thereof.

* * * * *